United States Patent
Jakobsson et al.

(10) Patent No.: US 6,393,447 B1
(45) Date of Patent: May 21, 2002

(54) METHOD AND APPARATUS FOR EXTRACTING UNBIASED RANDOM BITS FROM A POTENTIALLY BIASED SOURCE OF RANDOMNESS

(75) Inventors: Bjorn Markus Jakobsson, Hoboken, NJ (US); Ari Juels, Cambridge, MA (US)

(73) Assignees: Lucent Technologies Inc., Murray Hill, NJ (US); RSA Security Inc., Bedford, MA (US)

( * ) Notice: Subject to any disclaimer, the term of this patent is extended or adjusted under 35 U.S.C. 154(b) by 0 days.

(21) Appl. No.: 09/177,013

(22) Filed: Oct. 22, 1998

(51) Int. Cl.$^7$ ................................................. G06F 1/02
(52) U.S. Cl. ......................................................... 708/250
(58) Field of Search .............................. 708/250, 251, 708/252, 253, 254, 255, 256

(56) References Cited

U.S. PATENT DOCUMENTS 4,513,386 A * 4/1985 Glazer ........................ 708/255
5,515,307 A * 5/1996 Aiello et al. ................. 708/254
5,987,483 A * 11/1999 Edelkind et al. ............ 708/250

OTHER PUBLICATIONS

J. von Neumann, "Various Techniques used in Connection with Random Digits," In National Bureau of Standards, Applied Math Series, vol. 12, pp. 36–38, 1951, Notes by G.E. Forsythe, Reprinted in Neumann's Collected Works, vol. 5, Pergamon Press, 1963.

D. Feldmann et al., "On Dice and Coins: Models of Computation for Random Generation," Information and Computation, 104(2):159–174, Jun. 1993.

E. W. Dijkstra, "Making a Fair Roulette from a Possibly Biased Coin," Information Processing Letters 36, p. 193, Nov. 1990.

Q.F. Stout and B. Warren, "Tree Algorithms for Unbiased Coin Tossing with a Biased Coin," The Annals of Probability, vol. 12, No. 1, pp. 212–222, 1984.

M. Blum, Independent Unbiased Coin Flips from a Correlated Biased Source: A Finite State Markov Chain, $25^{th}$ IEEE Symposium on Foundation of Computer Science, pp. 425–433, 1984.

* cited by examiner

*Primary Examiner*—Chuong Dinh Ngo
(74) *Attorney, Agent, or Firm*—Ryan, Mason & Lewis, LLP

(57) ABSTRACT

The invention generates a random bit string from a sequence of readings taken from a potentially biased source of randomness, such as a random stationary source which can be represented as a biased die. A simulated unbiased source is generated from the potentially biased source, and a reading is taken from the simulated unbiased source. The reading is then converted to a bit string. Taking a reading from the simulated unbiased source may involve generating an integer pair (R,S), which depends on the sequence of readings from the random source, and represents a roll of value R on a simulated unbiased die U with S sides. The pair (R,S) is then converted into an output bit string $b_k b_{k-1} \ldots b_1$ which is unbiased over sequences of readings from the random source.

15 Claims, 5 Drawing Sheets

FUNCTION $Q_1(X)$
/* INPUT: A SEQUENCE $X = \{X[1], X[2], ..., X[n]\}$ OF READINGS FROM A
       BIASED DIE $D$
   OUTPUT: A PAIR $(R, S)$ REPRESENTING A ROLL $R$ OBTAINED ON AN
       UNBIASED DIE $U$ WITH $S$ SIDES */

/* COMPUTE RANK FREQUENCIES */
for $i = 1$ to $n$
    $fr[i] = 0$;
for $i = 1$ to $n$
    $fr[rank(X[i], X)]$++;

/* COMPUTE NUMBER OF SIDES OF DIE $U$; THIS IS $S = n!/\Sigma(fr_X(i)!)$ */
$S = $ factorial$(n)$;
for $i = 1$ to $n$
    $S = S$ / factorial$(fr[i])$;

$L = 0$;
$F = S$;
/* MAIN LOOP */
for $i = 1$ to $n - 1$
    /* NOTE THAT $U_n$ IS A 1-SIDED DIE, AND CAN THEREFORE BE EXCLUDED */

/* COMPUTE DATA FOR DIE $U_i$ */
    $l = 0$;
    for $j = 1$ to rank$(X[i], X) - 1$
        $l = l + fr[j]$;
    $v = fr[rank(X[i], X)]$;

/* FOLD DATA FOR DIE $U_i$ INTO CUMULATIVE ROLL */
    $f = n - i + 1$
    $L = L + (l/f) * F$;
    $F = (v/f) * F$;

/* UPDATE FREQUENCY TABLE FOR REMAINING MEASUREMENTS */
    $fr[rank(X[i], X)]$ --;

$R = L + 1$;
return $(R, S)$;

FIG. 4

FUNCTION $Q_2(R, S)$
/* INPUT: A PAIR $(R, S)$ REPRESENTING A ROLL $R$ OBTAINED ON AN
   UNBIASED DIE $U$ WITH $S$ SIDES
   OUTPUT: AN UNBIASED BITSTRING */

$s_k \; s_{k-1} \ldots s_1 = binary(S)$;
$r_j \; r_{j-1} \ldots r_1 = binary(R - 1)$;
$r_k \; r_{k-1} \ldots r_{j+1} = 00 \ldots 0$;
for $i = k$ down to 2
    if $s_i = 1$ and $r_i = 0$ then
            return $(r_{i-1} r_{i-2} \ldots r_1)$;
return $(\phi)$;

METHOD AND APPARATUS FOR EXTRACTING UNBIASED RANDOM BITS FROM A POTENTIALLY BIASED SOURCE OF RANDOMNESS

FIELD OF THE INVENTION

The invention relates generally to random number generation, and more particularly to techniques for generating unbiased bit streams from a sequence of readings taken from a possibly biased random source.

BACKGROUND OF THE INVENTION

Sequences of random numbers are of considerable importance in cryptography and many other computing applications, such as stochastic simulation, search heuristics, and game playing. Because truly random numbers are a scarce resource, it is common practice to derive such sequences from pseudo-random number generators. A pseudo-random number generator is a device which takes a truly random input and "stretches" it to produce a long sequence of numbers bearing an appearance of randomness. Although there is a large body of literature on the design and properties of pseudo-random number generators, much less attention has been devoted to the physical (generation and processing of the random input seeds that fuel these generators. It is common practice in the literature to obtain a random seed by invoking a so-called "uniform random source." Practitioners have called into service a variety of physical sources of randomness. These include system clocks, radioactive sources, quantum mechanical effects in semiconductor devices, hard disk timings, and keyboard and mouse timings. Timings of human interaction with a keyboard or mouse are currently the most common source of random seeds for cryptographic applications on personal computers. After a sufficient amount of such timing data is gathered, it is generally hashed down to a 128-bit or 160-bit seed. However, this method relies for its security guarantees on unproven or unprovable assumptions about the entropy generated by human users and the robustness of hash functions as entropy extractors.

Many of these sources of randomness, such as radioactive sources or hard disk timings, yield data from probability distributions that are stationary. In other words, the output distribution of these sources does not change over time. Even if a source is stationary, though, it generally has a bias. In other words, the source does not give unbiased bits as direct output. Many applications, especially in cryptography, rely on sequences of unbiased bits. It is therefore quite important to be able to extract unbiased bits efficiently from a stationary source with unknown bias.

Suppose that a reading obtained from a stationary source of randomness D can be equal to any one of m different values, but that the probability of obtaining any one of these values is unknown. Such a source of randomness can be thought of as a die D with m sides, i.e., taking readings from the random source is like rolling the die D. The m sides of D are not necessarily equally probable. In other words, the die D may be biased. A number of techniques have been developed which attempt to obtain unbiased random bits from biased sources of randomness. Such techniques are described in, for example, J. von Neumann, "Various Techniques used in Connection with Random Digits," In National Bureau of Standards, Applied Math Series, Vol. 12, pp. 36–38, 1951, Notes by G. E. Forsythe, Reprinted in Neumann's Collected Works, Vol. 5, Pergamon Press, 1963; P. Elias, "The Efficient Construction of an Unbiased Random Sequence," Ann. Math. Statist., 43(3):865–870, 1972; M. Blum, "Independent Unbiased Coin Flips from a Correlated Biased Source: A Finite State Markov Chain, $25^{th}$ IEEE Symposium on Foundations of Computer Science, pp. 425–433, 1984; M. Santha and U. Vazirani, "Generating Quasi-Random Sequences from Slightly-Random Sources," $25^{th}$ IEEE Symposium on Foundations of Computer Science, pp. 434–440, 1984; and D. Feldmann et al., "On Dice and Coins: Models of Computation for Random Generation," Information and Computation, 104(2):159–174, June 1993. Unfortunately, these and other conventional techniques fail to provide adequate practical solutions to the problem of efficiently extracting unbiased random bits from biased physical sources of randomness.

SUMMARY OF THE INVENTION

The invention provides efficient techniques for extracting unbiased bits from potentially biased physical sources of randomness. In an illustrative embodiment, a stationary physical source of randomness, such as a source which can be represented as a biased die having an unknown bias, may be used to generate unbiased random bits. A simulated unbiased source is generated using readings from the potentially biased source, and a reading is taken from the simulated unbiased source. The reading from the simulated unbiased source is then converted to a bit string. Taking a reading from the simulated unbiased source may involve, for example, generating an integer pair (R,S), which depends on the sequence of readings from the random source. The integer pair (R,S) represents a roll of value R on a simulated unbiased source corresponding to an unbiased die U with S sides. The pair (R,S) is then converted into an output bit string $b_k b_{k-1} \ldots b_1$ which is unbiased over sequences of readings from the random source.

In accordance with another aspect of the invention, the integer pair (R,S) may be generated by first generating an ordered list of all S possible permutations of the elements of the sequence of readings taken from the random source, and then selecting from the ordered list an Rth element which corresponds to the sequence of readings taken from the random source. In another possible implementation, the integer pair (R,S) may be generated by simulating a roll on each of a number of sources represented as unbiased dice, using information in the sequence of readings taken from the random source, and combining the rolls for these sources to simulate the roll R on a source which may be represented as an unbiased die U with S sides. The reading from the simulated unbiased source may be converted to a bit string by partitioning the sides $\{1, 2, \ldots, S\}$ of U into sets $A_1, A_2, \ldots, A_j$ such that the set sizes $|A_1|, |A_2|, \ldots, |A_j|$ are unique, decreasing powers of two, and then assigning a mapping from elements of each set to a corresponding set of bit strings. In another possible implementation, the reading from the simulated unbiased source may be converted to a bit string by, for example, converting the values R−1 and S into k-bit integers, comparing the resulting bit strings $r_k r_{k-1} \ldots r_1$ and $s_k s_{k-1} \ldots s_1$ to locate a pair of bits $r_j$ and $s_j$ such that $s_j=1$ and $r_j=0$, and outputting the bits $r_{j-1} r_{j-2} \ldots r_1$.

The techniques of the invention can be shown to be optimally efficient in terms of output entropy, and are computationally practical to implement. More particularly, an extractor in accordance with the invention can be configured to output a maximal expected number of bits for a given number of readings, but, unlike certain conventional techniques, has no minimal number of readings required before it can produce output. The invention is therefore particularly well suited for use in extracting useful randomness in the form of bit strings from any stationary physical source.

BRIEF DESCRIPTION OF THE DRAWINGS

FIG. 4 shows exemplary pseudocode for implementing the element $Q_1$.

DETAILED DESCRIPTION OF THE INVENTION

The present invention will be illustrated herein in the form of an exemplary random bit generator. It should be understood, however, that the invention is more broadly applicable to any system in which random bits are generated from a random source. The term "source" as used herein is intended to include any source of randomness which may be used to generate a sequence of biased or unbiased random values, including stationary and non-stationary sources. For example, a source may be implemented as software, hardware, or various combinations thereof for generating a set of random readings which may be represented as readings taken from one or more dice. The term "die" as used herein should therefore be understood to include any type of electronic device or other mechanism which is capable of simulating the operation of a die or set of dice. A "roll" of a die refers generally to the process of utilizing the die to obtain a reading. A "side" of a die refers to a possible value for a given reading taken from that die. The terms "bit string" and "bit sequence" as used herein are intended to include not only the actual bits in a given set of bits, but also other representations of such bits, including non-binary representations of the bits.

Figure 1:
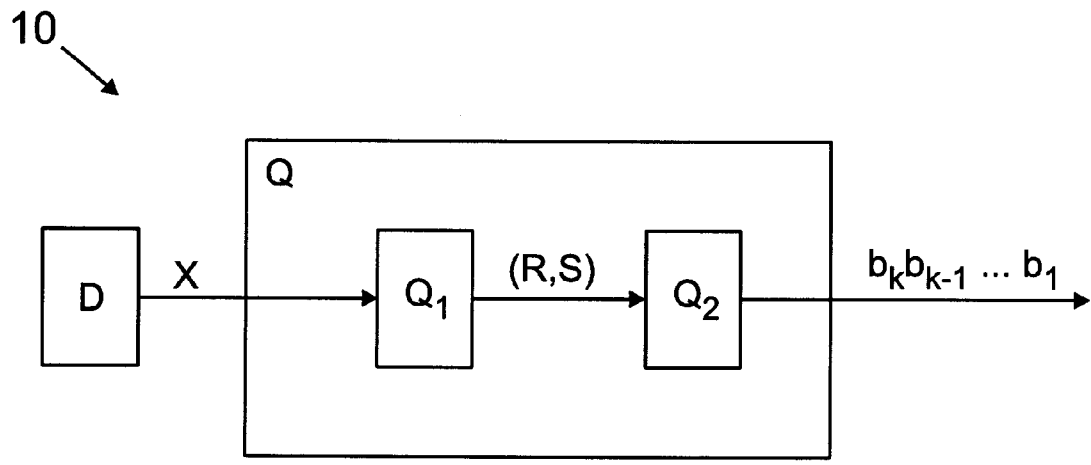
FIG. 1 shows one possible embodiment of a random bit generator including a random bit extractor in accordance with the invention.

FIG. 1 shows an exemplary random bit generator 10 in accordance with an illustrative embodiment of the invention. The random bit generator 10 includes a random source D and a fair bit extractor Q. The extractor Q receives as an input from D a sequence $X=\{X[1],X[2], \ldots , X[n]\}$ of n elements in R, where n is any positive integer. The random source D may be, for example, a stationary but potentially biased source, and the elements of X may be, for example, real-valued or integer-valued readings derived from D. The extractor Q outputs a sequence $b_1, b_2, \ldots , b_k$ of bits, where k is an integer that varies as a function of X. We denote the output of Q on input X by Q(X). Hence, Q may be viewed as a function $Q:R^n \to \{0,1\}^*$.

It can be assumed for purposes of illustration that the source D provides a fixed probability distribution over a finite set of elements in R. For example, D may be thought of as a die, such that rolling this die is equivalent to drawing an element from the fixed probability distribution. Assuming the source D is a die or a source which can be represented as a die, we shall let $D^n$ denote the probability distribution over n rolls of the die D, i.e., the probability distribution from which a sequence X of n rolls is drawn. We define a "fair bit extractor" to be one which takes inputs from a fixed distribution and outputs bit strings in which bits are independent and unbiased. In other words, a bit extractor is fair if for any n, any fixed probability distribution D over R, and any pair of bit strings b and b' of equal length, $Pr_{X \in D^n}[Q(X)=b]=Pr_{X \in D^n}[Q(X)=b']$. Let $bits_Q(X)$ denote the number of bits output by extractor Q on input X. A fair bit extractor Q is said to be "optimal" if for any n and D, and all extractors Q', $E_{X \in D^n}[bits_{Q'}(X)] \leq E_{X \in D^n}[bits_Q(X)]$. In other words, Q outputs a maximal expected number of bits over all sequences of n readings.

The sequence $X=\{X[1], X[2], \ldots , X[n]\}$ is a sequence of readings drawn from the distribution $D^n$. We refer to the number of distinct readings in X less than or equal to X[i] as the rank of X[i], denoted by rank(X[i]). By way of example, suppose that the source D yields the output sequence $X=\{15, 10, 23, 6, 10, 23\}$. Then X[1]=5, X[2]=10, X[3]=23, X[4]=6, etc. Here, rank(X[1])=1, rank(X[2])=3, rank(X[3])=4, rank(X[4])=2, rank(X[5])=3, and rank(X[6])=4. We call $\rho(X)=\{rank(X[1]), rank(X[2]), \ldots , rank(X[n])\}$ the rank sequence of X. We denote by $\{\rho(X)\}$ the rank multiset of X. This is the unordered multiset on the set $\rho(X)$. Finally, we let $fr_X(i)$ denote the number, i.e., the frequency, of readings in X with rank i; $fr_X(i)$ may also be viewed as the number of occurrences of the integer i in $\rho(X)$ or $\{\rho(X)\}$. Suppose again, as in the previous example, that the die D yields the output sequence $X=\{5, 10, 23, 6, 10, 23\}$. The rank sequence of X is $\rho(X)=\{1, 3, 4, 2, 3, 4\}$. Thus, $fr_X(1)=1$, $fr_X(2)=1$, $fr_X(3)=2$, and $fr_X(4)=2$.

Assume for purposes of illustration that the only information we know is that 11 rolls of the die D have yielded a set of readings X with the rank multiset $\{\rho(X)\}$. Observe then that any ordering on $\{\rho(X)\}$ is a possible rank sequence $\rho(X)$ for X. A priori, all such rank sequences $\rho(X)$ are equally probable. For example, given that $\{\rho(X)\}=\{1,2,3\}$, it is equally likely that $\rho(X)=\{3,2,1,1\}$ as it is that $\rho(X)=\{1,2,1,3\}$ as it is that $\rho(X)=\{1,2,3,1\}$, etc. Using this observation, we can simulate an unbiased die as follows. Given a sequence X, we construct a list of all possible orderings on the multiset $\{\rho(X)\}$ in numerical order, i.e., in ascending order of integer value. Observe that the number of elements in this list is equal to $n!/\Pi(fr_X(i)!)$; let us call this number S. If $\rho(X)$ is the Rth element in this list of orderings on $\{\rho(X)\}$, we output R. In other words, we output the rank of $\rho(X)$ in $\{\rho(X)\}$.) The output R may be seen to represent the result of a single roll of an unbiased die U with S sides labeled 1,2,3, . . . , S. For example, suppose that we obtain the sequence of readings $X=\{10,5,15\}$ on three rolls of the die D. This translates into the rank sequence $\rho(X)=\{2,1,3\}$. The corresponding rank multiset $\{\rho(X)\}=\{1,2,3\}$ has 3!=6 possible orderings. In numerical order, these are: 123, 132, 213, 231, 312, 321. Since the rank sequence $\rho(X)$ comes 3rd in this list, our sequence X corresponds to a roll of R=3 on an unbiased die U with S=6 sides labeled $\{1,2, \ldots , 6\}$.

As shown in FIG. 1, the illustrative embodiment of the extractor Q is comprised of elements $Q_1$ and $Q_2$. The element Q uses the biased die D to simulate the unbiased die U. The element $Q_2$ takes a roll of the simulated unbiased die U and converts it into an unbiased bit string. Hence, the extractor $Q=Q_2 \circ Q_1$ will take a sequence of readings X from the biased die D and convert the sequence into an unbiased bit string. More particularly, element $Q_1$ takes the sequence X of readings from source D and outputs an integer pair (R,S). The pair (R,S), which depends on the sequence X, represents a roll R on a simulated, unbiased die U with S sides. The pair (R,S) is input into element $Q_2$, which converts the pair (R,S) into an output bit string $b_k b_{k-1} \ldots b_1$. The bit string $b_k b_{k-1} \ldots b_1$ will be unbiased over reading sequences X derived from D.

Figure 2:
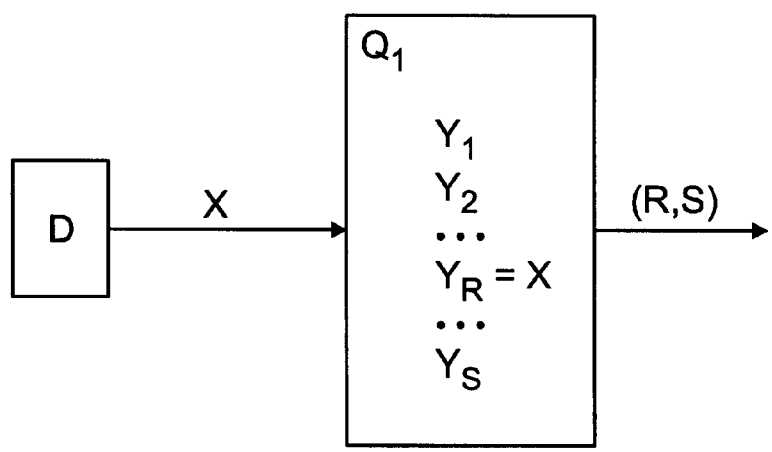
FIGS. 2 and 3 show more detailed views of an element $Q_1$ of the FIG. 1 extractor.

FIG. 2 illustrates one possible embodiment of the element $Q_1$ of extractor Q. The sequence X of readings from source D is input to element $Q_1$. The element $Q_1$ then generates a numerically or otherwise ordered list $Y_1, Y_2, \ldots, Y_S$ of all S possible permutations of the elements of X. A unique element $Y_R$ in this list will be equal to X. The element $Q_1$ then outputs the pair (R,S).

It should be noted that the efficiency of Q generally increases with the length of the sequence X. However, the approach of constructing $Q_1$ by explicitly listing all possible orderings on $\{\rho(X)\}$ as described above may often be impractical in many applications. This is because if we use a sequence long enough for Q to yield output efficiently, the list of orderings is likely to be unduly long. If, for example, there are only 20 readings in the sequence X, the number of elements in the list in question may be as large as 20!, which is greater than $2.4 \times 10^{18}$. In a more practical implementation, therefore, we can compute $Q_1(X)$ without reference to an ordered list. One way to achieve this is as follows. We examine the readings in X in sequential order, i.e., in step i we examine X[i]. Let $\rho_i(X)$ denote the rank set on the truncated sequence $\{X[i], X[i+1], \ldots, X[n]\}$, and let $rank_i(X[i])$ denote the rank of X[i] in this truncated sequence. A priori, i.e., given knowledge of $\rho_i(X)$, but not of $rank_i(X[i])$, the value $rank_i(X[i])$ will be equal to any of the elements in $\rho_i(X)$ with equal probability. Hence, a postiori, we may regard $rank_i(X[i])$ as the result of rolling an unbiased die $U_i$ whose sides consist of the set $\rho_i(X)$. This means that $U_i$ is a die with n−i+1 sides, all of which are equally likely. Note, however, that $U_i$ may have multiple sides with the same label, as $\rho_i(X)$ may contain repeats.

As an example, suppose that X={15, 10, 5, 15, 5}, and consider the die $U_3$. The rank set is given by $\rho(X)=\{3, 2, 1, 3, 1\}$. The rank set $\rho_3(X)=\{rank_3(5), rank_3(15), rank_3(5)\} = \{1,2,1\}$. This means that, a priori, the die $U_3$ has three sides, i.e., those in the set {1,2,1}. The a priori probability of obtaining a 1 on this die is 2/3, while that of obtaining a 2 is 1/3. Since $rank_3(X[3])=rank_3(5)=1$, a postiori, the actual roll obtained on $U_3$ is a 1.

Figure 3:
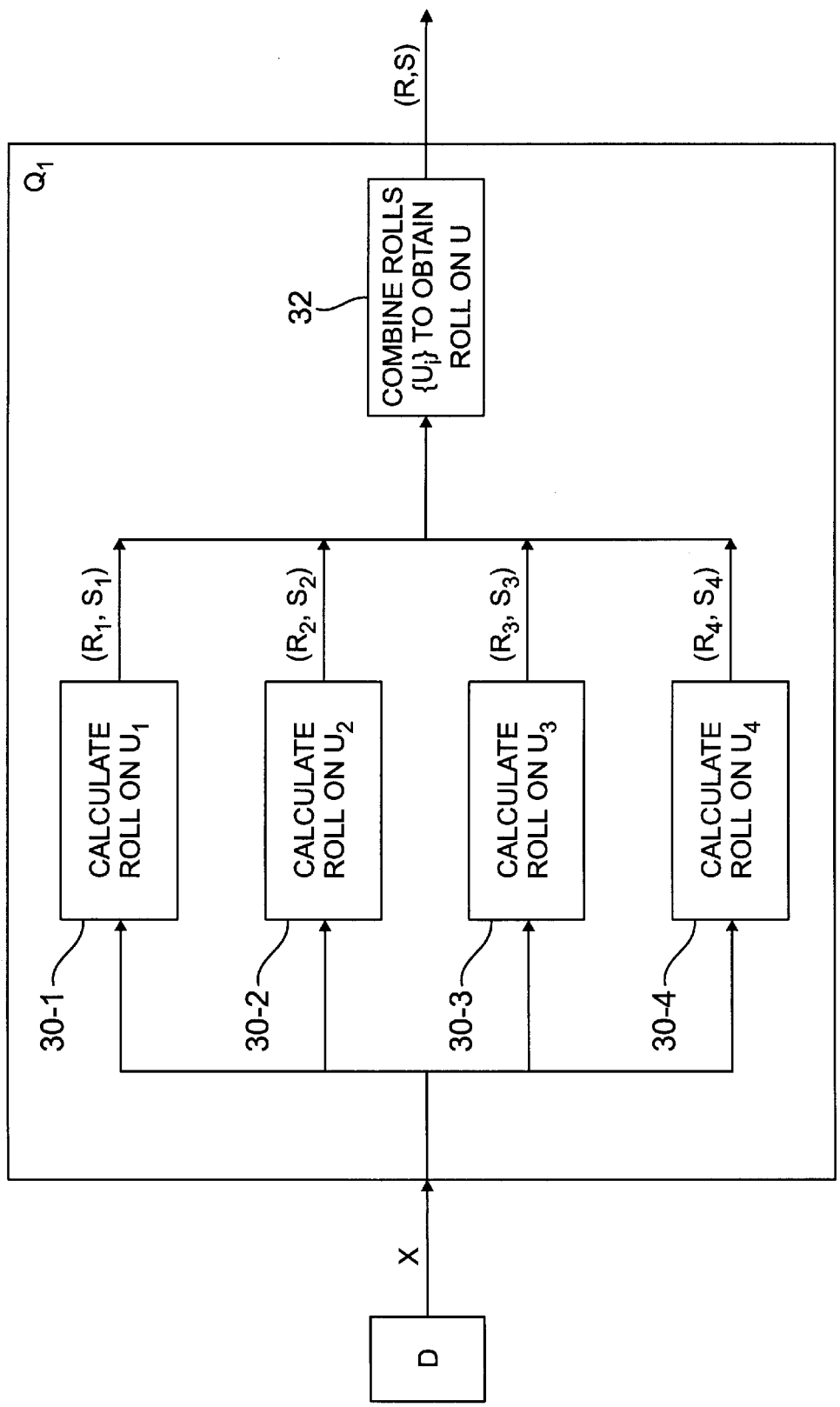

In computing $Q_1(X)$, i.e., the roll R on the full, unbiased die U, we can therefore compute the results of the individual rolls on $U_1, U_2, \ldots, U_n$ and combine them cumulatively into a single roll. FIG. 3 shows one such implementation of element $Q_1$. As in the previous embodiment, the sequence X of readings from source D is input to element $Q_1$. For clarity of illustration, it is assumed in this example that X comprises four readings, but any positive number of readings is possible in this and other embodiments of the invention. The element $Q_1$ supplies the sequence X, or some portion thereof, to an element 30-1 which simulates a roll $R_1$ on an unbiased die $U_1$ with $S_1$ sides, by making use of the data in X. Similarly, the element $Q_1$ supplies the sequence X, or portions thereof, to elements 30-2, 30-3 and 30-4, which simulate rolls $R_2$, $R_3$ and $R_4$, respectively, on unbiased dice $U_2$, $U_3$, $U_4$ with sides $S_2$, $S_3$, $S_4$, respectively, using the data in X. The integer pairs $(R_1, S_1)$, $(R_2, S_2)$, $(R_3, S_3)$ and $(R_4, S_4)$ obtained for the simulated dice $U_1$, $U_2$, $U_3$, and $U_4$, or a subset thereof, are subsequently input into an element 32 which combines them to simulate a roll R on an unbiased die U with S sides. The element $Q_1$ then outputs the integer pair (R, S).

FIG. 4 shows an exemplary set of pseudocode for implementing the illustrative embodiment of $Q_1$ described in conjunction with FIG. 3. This pseudocode takes a potentially biased sequence X and outputs a pair (R, S) representing the roll R obtained from an unbiased die U with S sides. Recall that in order to compute $Q_1(X)$ efficiently, we may compute the rolls of a series of small, unbiased dice $U_1, U_2, \ldots, U_n$ associated with X, and then combine these small dice into a large, unbiased die U. Recall too that the die $U_i$ has n−i−1 sides, labeled with elements of the rank set $\rho_i(X)$. Since some of these sides may have identical labels, it is convenient in the pseudocode to represent the roll obtained from $U_i$ as a sub-interval [l,l+v] over the interval [0,f], where f=n−i−1, the number of sides of $U_i$. The value l may be viewed as a representation of the roll r obtained on $U_i$. In particular, if the side that comes up on rolling $U_i$ has label r, then l is the number of sides with label values less than r. The value v is equal to the number of sides bearing the label r. Note that v/f is the a priori probability of obtaining the roll r on $U_i$, while 1/f is the a priori probability of obtaining a roll value less than r. For the above example in which X={15, 10, 5, 15, 5}, $r_2(X)=\{2,1,3,1\}$, hence the die $U_2$ has four sides; these bear the labels {1, 2, 3}. The roll r obtained on $U_2$ in this example is $r=rank_2(10)=2$. Since there is only one side bearing a label less than 2, and since label 2 appears on only one side of $U_2$, this roll corresponds to the sub-interval [2, 3] over the interval [0,4]. Note that the a priori probability of obtaining a roll of 2 on $U_2 = v/f = (3-2)/4 = 1/4$.

In the exemplary pseudocode of FIG. 4, the element $Q_1$ maintains a space [L, F] of possible outcomes of the die U. On initialization, this space is equal to [0, S]. In each iteration i, this space is narrowed with respect to the roll obtained on die $U_i$. As explained above, the roll obtained on $U_i$ is represented as a sub-interval [l,l+v] on the interval [0,f]. The value of the lower bound l on the roll of $U_i$ serves to update L, the lower bound on the space of possible outcomes of U. In particular, we set L=l/f*L in each iteration. The value v is used to update F, the number of remaining sides that serve as possible outcomes of U. We set F=v/f*F in each iteration. Recall that v/f is the a priori probability of obtaining the roll r on die $U_i$. Thus, as expected, the smaller the a priori probability associated with r, the more the roll r narrows the possible remaining outcomes of U. We assume here the existence of a function factorial(i) which computes i!. It is important that this function adhere to the convention that 0!=1. Also assumed is the existence of a function rank(X[i], X) which computes the rank of X[i] in the sequence X.

The element $Q_2$ that translates a roll R of the unbiased die U into an unbiased bit string will now be described in greater detail. A potential difficulty here lies in resolving the fact that S is not, in general, a power of 2, such that an unbiased mapping from a die roll to bit strings of a fixed length may not be possible. Instead, we begin by partitioning the sides {1, 2, ..., S} of the die U into sets whose sizes are powers of 2. In particular, we partition the sides of U into sets $A_1$, $A_2$, ..., $A_j$ such that the set sizes $|A_1|, |A_2|, \ldots, |A_j|$ are unique, decreasing powers of 2. This is equivalent to the following. Let $s_k s_{k-1} \ldots s_1 s_0$ be a binary representation of S. Moving from left to right, for each $s_c=1$, we create a distinct set $A_i \in \{1, 2, \ldots, S\}$ such that $|A_i|=2^c$; thus, j represents the number of bits in $s_k s_{k-1} \ldots, s_1 s_0$ equal to 1. Although the sides of U may be assigned arbitrarily to the sets $\{A_i\}$, it is convenient to assign them in numerical order, i.e., $1 \in A_1, \ldots, S \in A_j$.

To complete the construction of $Q_2$, we assign a mapping from each set $A_i$ to a set of bit strings. Recall that for each set $A_i$, $|A_i|=2^c$ for some c. The element $Q_2$, then, maps the elements of $A_i$ to the set $\{0,1\}^c$ of bit strings in a one-to-one fashion. This mapping $Q_2: A_i \to \{0,1\}^c$ can be ordered arbitrarily, but it is convenient to make it increasing, i.e., to map larger valued sides of U to larger valued bit strings. This completes the definition of an illustrative embodiment of $Q_2: \{1,2, \ldots, S\} \to \{0,1\}^*$. Note that $Q_2$ will map different sides of U to bit strings of differing lengths when S is not a power of 2. Note also that if S is odd, then one sequence produces no output, i.e., c=0 for the set $A_j$.

Continuing with the previous example in which we obtained from the die D the sequence of readings X={10, 5,15}, recall that the element $Q_1$ mapped this sequence X to a roll of R=3 on an unbiased die U with 6 sides. In the construction of $Q_2$, the sides {1, 2, 3, 4, 5, 6} of U are partitioned into sets $A_1$ and $A_2$ such that $|A_1|=2^2=4$ and $|A_2|=2^1=2$. In particular, $A_1$={1,2,3,4} and $A_2$={5,6}. The element $Q_2$ is then defined by the following table.

TABLE 1

| R | $Q_2(R)$ |
|---|---|
| A1: 1 | 00 |
| 2 | 01 |
| 3 | 10 |
| 4 | 11 |
| A2: 5 | 0 |
| 6 | 1 |

Hence, $Q_2(R)=Q_2(3)$='10'. As a result, the bit extractor Q yields as output on X={10,5,15} the bit string $Q(X)=Q_2(Q_1(X))$='10'. It is assumed for simplicity in this illustrative embodiment that the die D has a finite number of sides. Note, however, that an extractor Q in accordance with the invention may also be used with a source of randomness which yields any one of an infinite number of values, e.g., a die D having an infinite number of sides.

Figure 5:
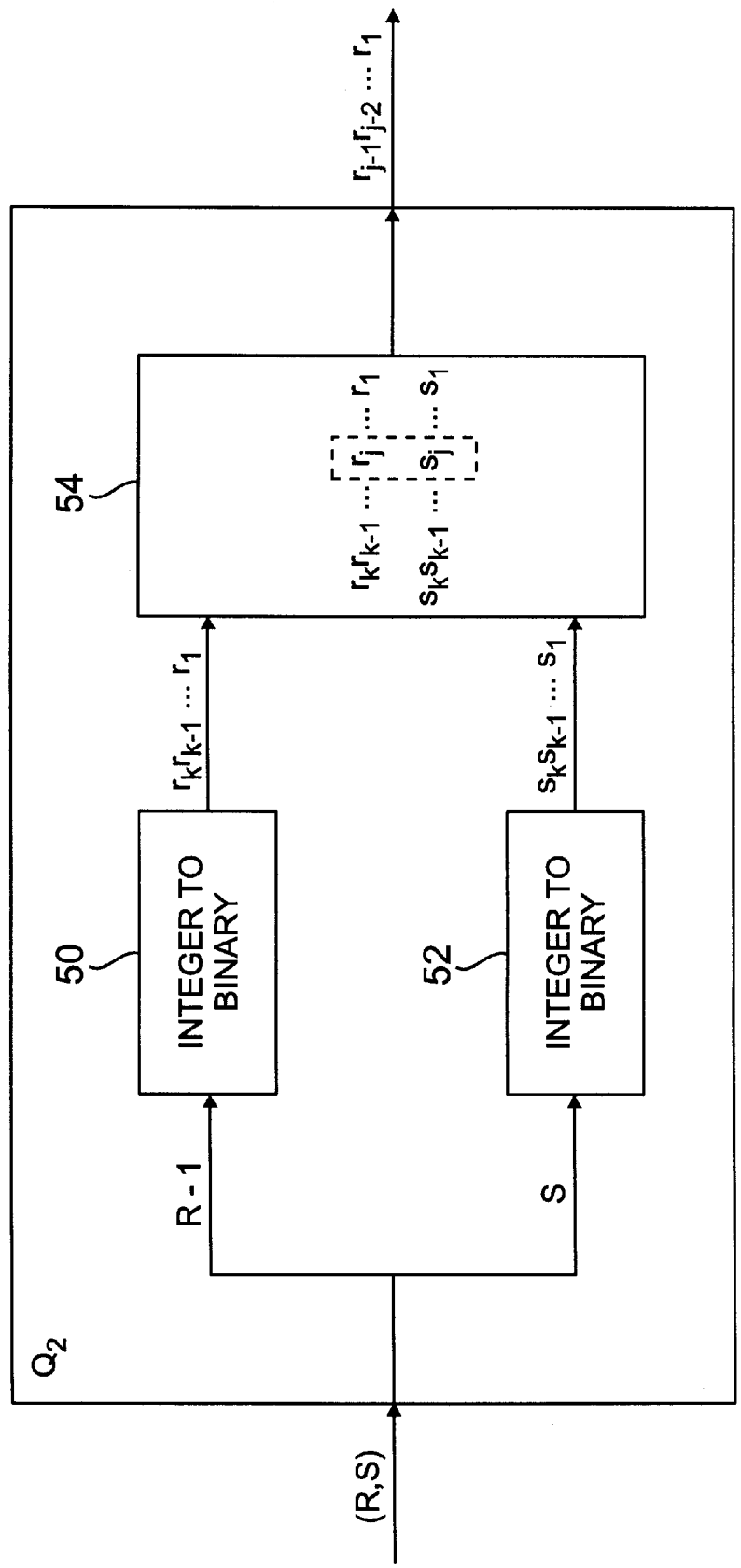
FIG. 5 shows a more detailed view of an element $Q_2$ of the FIG. 1 extractor.

FIG. 5 shows a practical implementation of the element $Q_2$. An integer pair (R,S), representing a roll R obtained on an unbiased die U with S sides, is input into element $Q_2$. The value R−1 is input to an integer-to-binary converter 50 that converts R−1 into a k-bit integer, with high-order padding of 0 bits as necessary. The value S is input to an integer-to-binary converter 52 that converts S into a k-bit integer. The resulting bit strings $r_k r_{k-1} \ldots r_1$ and $S_k S_{k-1} \ldots S_1$ are subsequently input to a comparison element 54. Element 54 compares the two bit strings from left to right, i.e., from high-order bit to low-order bit, until a pair of bits $r_j$ and $s_j$ is found such that $s_j$=1 and $r_j$=0. At this point, the bits $r_{j-1} r_{j-2} \ldots r_1$ are output by element 54. If no such pair of bits is found, then a symbol φ is output, or some other appropriate output indicator is provided. In alternative embodiments, values other than R−1 and S could be used in converters 50 and 52, respectively.

Figures 6, 7:
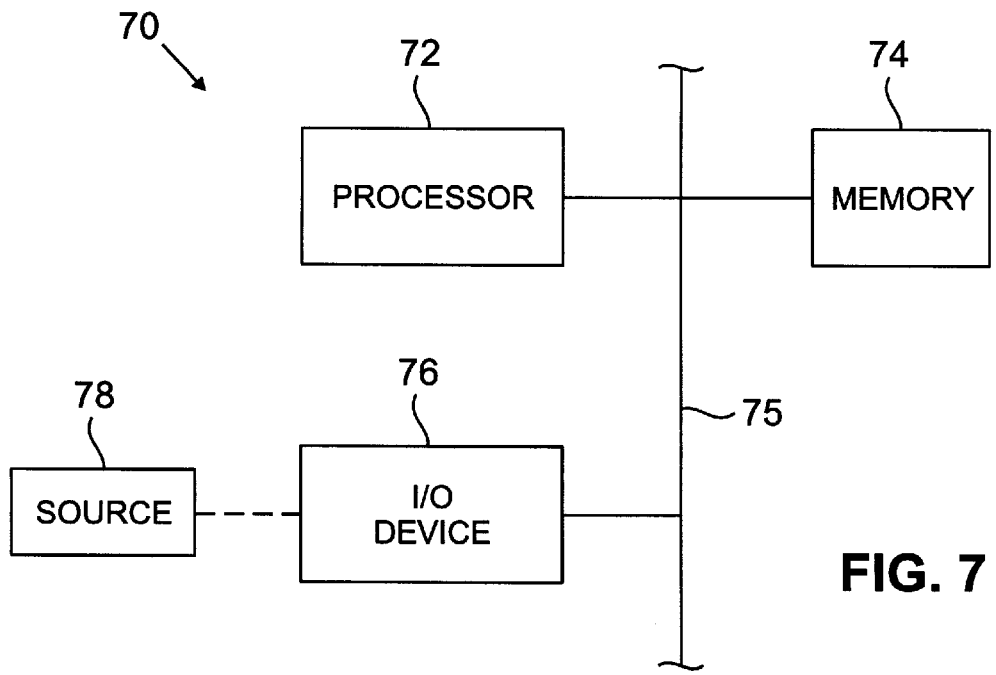
FIG. 6 shows exemplary pseudocode for implementing the element $Q_2$.
FIG. 7 is a block diagram of an exemplary processing system in which the invention may be implemented.

FIG. 6 shows a set of exemplary pseudocode for implementing the embodiment of element $Q_2$ described in conjunction with FIG. 5. In order to compute Q(X) for a given sequence X, we compute $Q_2(Q_1(X))$ using the pseudocode of FIGS. 4 and 6 for implementing the elements $Q_1$ and $Q_2$, respectively. The $Q_2$ pseudocode of FIG. 6 takes as input a pair (R,S), where S represents the number of sides of the unbiased die U from which the bits are being extracted, and R ∈ {1, 2, ..., S} represents the resulting roll of that die. The pseudocode outputs a variable number of bits, or i if no bits are to be returned. The pseudocode assumes the existence of a function binary(x) that returns a conversion of the integer x into a binary representation.

FIG. 7 shows an exemplary processing system 70 in which the invention may be implemented. The system 70 includes a processor 72 and a memory 74 each connected to a bus 75. Also connected to the bus 75 is an input/output (I/O) device 76. The processor 72 executes software program instructions stored in memory 74 in order to, for example, implement the pseudocode described in conjunction with FIGS. 4 and 6. The I/O device 76 receives one or more sequences of readings from a potentially biased random source 78, which may be remote from the system 70. For example, the I/O device 76 may be a modem or other communication device which establishes a connection over a network, e.g., the Internet. At least a portion of a given sequence is stored within the memory 74, for use by the processor 72 in generating unbiased bits as previously described. The processor 72 may be, for example, a microprocessor, a central processing unit (CPU), an application-specific integrated circuit (ASIC), as well as portions or combinations of the se and other processing elements. The memory 74 may be an electronic memory, a magnetic memory, an optical memory, as well as combinations or portions of these and other types of memories. System 70 may be implemented, for example, as a computer, workstation, personal digital assistant, set top box, smart card, or other processing device, and may therefore include additional elements which are not shown in FIG. 7.

It can be shown that the extractor Q in the illustrative embodiments of the invention described above is an optimal fair bit extractor. More particularly, it can be shown that a bit extractor is fair if and only if it is uniform, and it can further be shown that Q is optimal among bit extractors that are uniform. By definition, if a bit extractor is uniform, then it maps elements from any permutation class evenly among all bit strings of a given length. It can also be shown that the extractor Q is optimal in another sense, i.e., in that the number of output bits it yields is asymptotic to the Shannon entropy of the input source. The Shannon entropy serves as a reference point by which we may gauge the output efficiency of a bit extractor. It can be shown that the extractor Q described herein extracts nearly all of the Shannon entropy of a random source.

Although the bit extractor Q outputs unconditionally unbiased bits when applied correctly, it is important to make careful use of Q in order to obtain unbiased output. As the following example shows, there are uses of Q that may seem correct on first inspection, but in fact yield biased output. Suppose a user interested in obtaining a single unbiased bit from a die D makes use of the following process. Take readings X[1],X[2], ... from D until a sequence X is obtained such that Q(X) consists of at least one bit. Then output Q(X) and halt. It can be shown that this process yields biased output. Let us suppose that D is really a coin, and has two sides numbered 1 and 2. It is easy to see that the described process will halt on any sequence of the form {1, 1, 1, ..., 1, 2} and output a '0', and halt on any sequence of the form {2, 2, 2, ..., 2, 1} and output a '1'. The process will not halt on any other sequence. In particular, no output will be yielded on sequences of the form {1, 1, 1, ... } or {2, 2, 2, ... }. If D(1)=p and D(2)=1−p, it is easy to see that the probability that the described process outputs the bit '0' is p, while the probability of a '1' output is 1−p. Hence this use of Q yields biased output. Therefore, in order to ensure that the output of the extractor Q is unbiased, the user should provide Q with a sequence X of fixed length or of length independent of the properties of readings in X.

The illustrative embodiments describe an extractor Q for extracting unbiased bits from a physical source of randomness which may be viewed as a biased die. In alternative embodiments, there may be possible correlations between rolls of the source, although in this case, there is no way to obtain bits that are guaranteed to be completely independent and unbiased. In addition, although extractor Q in the illustrative embodiment is designed to work when the bias of physical source D is unknown, the invention may also be used with a physical source which has a known bias. These and numerous other alternative embodiments within the scope of the following claims will be apparent to those skilled in the art.

What is claimed is:

1. A method of generating a random bit string comprising the steps of:

taking a reading from a simulated unbiased source, wherein the simulated unbiased source is derived from a sequence of readings taken from a random source; and converting the reading from the simulated unbiased source to a bit string;

wherein the step of taking a reading from a simulated unbiased source includes the step of generating an integer pair (R,S), which depends on the sequence of readings from the random source, and represents a roll of value R on a simulated unbiased source corresponding to a simulated unbiased die U with S sides.

2. The method of claim 1 wherein the random source may be represented as a biased die.

3. The method of claim 1 wherein the random source is a random stationary source.

4. The method of claim 1 wherein the readings taken from the random source are at least one of integer-valued and real-valued.

5. The method of claim 1 wherein the random source is a random stationary source which generates a sequence of values each selected from a set of values.

6. The method of claim 1 wherein the step of converting the reading from the simulated unbiased source further includes converting the pair (R,S) into an output bit string $b_k b_{k-1} \ldots b_1$ which is unbiased over sequences of readings from the random source.

7. The method of claim 1 wherein the step of generating an integer pair (R,S) further includes the steps of:

generating an ordered list of all S possible permutations of the elements of the sequence of readings taken from the random source; and selecting from the ordered list an Rth element which corresponds to the sequence of readings taken from the random source.

8. The method of claim 1 wherein the step of generating an integer pair (R,S) further includes the steps of:

simulating a roll on each of a plurality of sources which may be represented as unbiased dice, using information in the sequence of readings taken from the random source; and combining the rolls for the plurality of sources to simulate the roll R on the source corresponding to the unbiased die U with S sides.

9. The method of claim 1 wherein the step of converting the reading from the simulated unbiased source to a bit string further includes the steps of:

partitioning the sides {1, 2, . . . , S} of the source corresponding to the die U into sets whose sizes are powers of two; and assigning a mapping from elements of each set to a corresponding set of bit strings.

10. The method of claim 9 wherein the step of partitioning the sides {1, 2, . . . , S} of the source corresponding to the die U into sets whose sizes are powers of two further includes partitioning the sides of the source into sets $A_1$, $A_2$, . . . , $A_j$ such that the set sizes $|A_1|, |A_2|, \ldots, |A_j|$ are unique, decreasing powers of two.

11. The method of claim 1 wherein the step of converting the reading from the simulated unbiased source to a bit string further includes the steps of:

converting the value R−1 into a k-bit integer;

converting the value S into a k-bit integer;

comparing the resulting bit strings $r_k r_{k-1} \ldots r_1$ and $S_k S_{k-1} \ldots S_1$ to locate a pair of bits $r_j$ and $s_j$ is found such that $s_j=1$ and $r_j=0$; and outputting the bits $r_{j-1} r_{j-2} \ldots r_1$.

12. An apparatus for generating a random bit string, the apparatus comprising:

an extractor operative (i) to take a reading from a simulated unbiased source, wherein the simulated unbiased source is derived from a sequence of readings taken from a random source; and (ii) to convert the reading from the simulated unbiased source to a bit string, wherein the taking of the reading from the simulated unbiased source includes generating an integer pair (R,S), which depends on the sequence of readings from the random source, and represents a roll of value R on a simulated unbiased source corresponding to a simulated unbiased die U with S sides.

13. An apparatus for generating a random bit string, the apparatus comprising:

a random source; and an extractor operative (i) to take a reading from a simulated unbiased source, wherein the simulated unbiased source is derived from a sequence of readings taken from the random source; and (ii) to convert the reading from the simulated unbiased source to a bit string, wherein the taking of the reading from the simulated unbiased source includes generating an integer pair (R,S), which depends on the sequence of readings from the random source, and represents a roll of value R on a simulated unbiased source corresponding to a simulated unbiased die U with S sides.

14. A machine-readable medium for storing one or more programs which when executed implement the steps of:

taking a reading from a simulated unbiased source, wherein the simulated unbiased source is derived from a sequence of readings taken from a random source; and converting the reading from the simulated unbiased source to a bit string;

wherein the step of taking a reading from a simulated unbiased source includes the step of generating an integer pair (R,S), which depends on the sequence of readings from the random source, and represents a roll of value R on a simulated unbiased source corresponding to a simulated unbiased die U with S sides.

15. An apparatus for generating a random bit string, the apparatus comprising:

a memory for storing at least a portion of a sequence of readings taken from a random source; and a processor operative (i) to take a reading from a simulated unbiased source, wherein the simulated unbiased source is derived from the sequence of readings taken from the random source; and (ii) to convert the reading from the simulated unbiased source to a bit string, wherein the taking of the reading from the simulated unbiased source includes generating an integer pair (R,S), which depends on the sequence of readings from the random source, and represents a roll of value R on a simulated unbiased source corresponding to a simulated unbiased die U with S sides.

\* \* \* \* \*